Aug. 1, 1950  J. C. ROWAN  2,517,507
SAFETY GAFF HOOK
Filed July 19, 1948
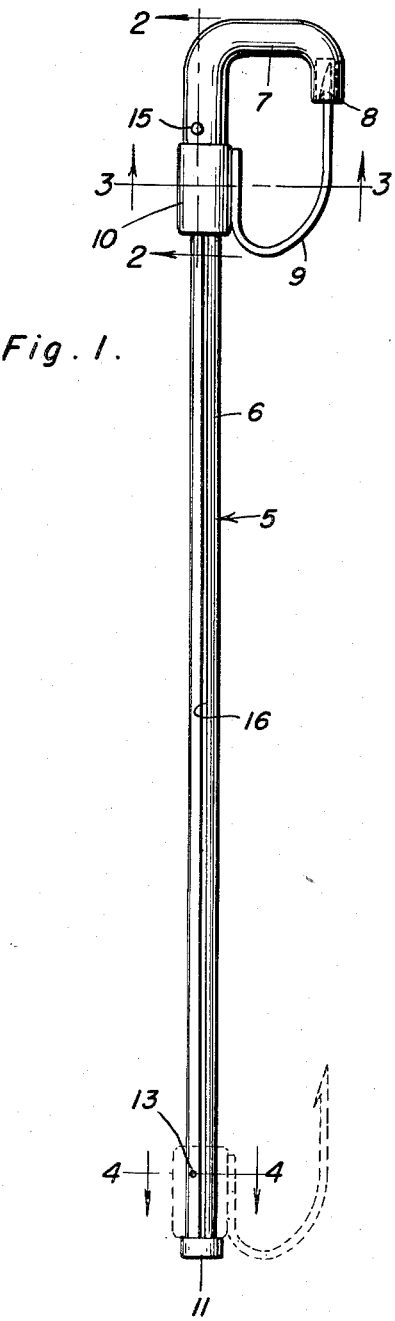
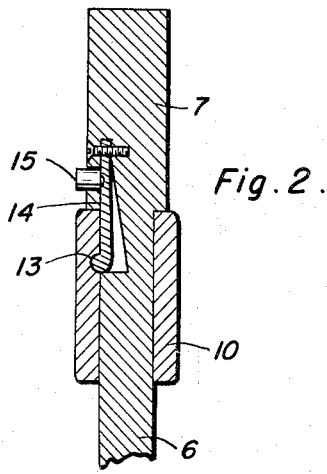
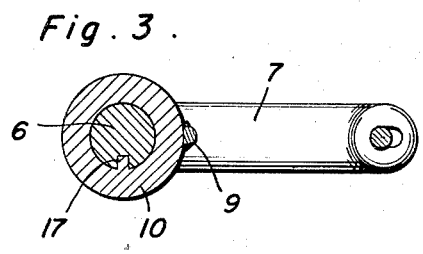
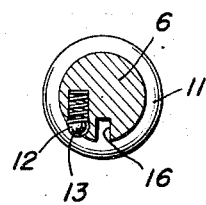
Jonas C. Rowan
INVENTOR.

Patented Aug. 1, 1950

2,517,507

UNITED STATES PATENT OFFICE 2,517,507

SAFETY GAFF HOOK

Jonas C. Rowan, Culver, Oreg.

Application July 19, 1948, Serial No. 39,502

3 Claims. (Cl. 294—26)

The present invention relates to new and useful improvements in gaff hooks and more particularly to means for safely carrying the gaff hook without danger of injury to a person, when not in use.

An important object of the invention is to provide a guard for the gaff hook to protect the hook when not in use and to form the guard at the inner end of a handle for the hook and to slidably mount the hook on the handle for movement into a position at the outer end of the handle ready for use in gaffing a fish and for movement into a position at the inner end of the handle when being carried.

A still further object is to provide a device of this character of simple and practical construction, which is strong and durable, efficient and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the hook in its carrying or protected position;

Figure 2 is a fragmentary longitudinal sectional view taken substantially on the line 2—2 of Figure 1;

Figure 3 is a transverse sectional view taken on a line 3—3 of Figure 1; and

Figure 4 is a transverse sectional view taken on a line 4—4 of Figure 1.

Referring now to the drawing in detail wherein, for the purpose of illustration, I have disclosed a preferred embodiment of the invention, the numeral 5 designates the handle of the gaff hook constructed substantially in the form of a walking cane to provide a shank 6 and hand grip 7. The outer end of the hand grip projects forwardly and is recessed as shown at 8.

The bill portion of the gaff hook is indicated at 9 and to which is formed or suitably attached a sleeve 10 which slides longitudinally on the shank 6.

The sleeve 10 and hook 9 may slide from a position adjacent the inner end of the shank 5, as shown by the full lines in Figure 1 in the drawing, and whereupon the barb or point of the hook is concealed in the recess 8 of the hand grip 7, or the sleeve 10 may slide toward the outer end of the shank, as shown by the dotted lines in Figure 1, for use in the usual manner in gaffing a fish.

A stop 11 is formed at the outer end of shank 5 for the sleeve and a spring projected ball catch 12 recessed in the outer end of the shank engages an internal recess 13 in the sleeve to hold the hook in its outer position against the stop 11.

A catch 14 is also provided on the hand grip 7 with its free end held under spring tension in engagement in the recess 13 of the sleeve to hold the hook in its retracted position, the catch being provided with a push button 15 to release the catch for lowering the sleeve on the shank of the handle.

The shank 6 is formed with a longitudinal groove 16 and the sleeve 10 is formed with an internal tongue or rib 17 engaged in the groove to prevent turning of the hook on the shank.

In the operation of the device with the sleeve 10 and hook 9 held in its retracted position at the inner end of shank 6, the hook may be carried as a cane in a safe position against injury to a person and by releasing catch 14, the sleeve 10 and hook 9 will slide downwardly to the outer end of shank 6 where it is held by stop 11 and catch 12 and is then ready for use in gaffing a fish.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A gaff hook comprising a handle, a U-shaped hand gripping portion at the rear of the handle and having a recess at its outer end forming a guard for the hook, a hook slidably mounted on the handle and a snap catch at each end of the handle for locking the hook at either end thereof.

2. A gaff hook comprising a handle, a hook slidably mounted on the handle for selectively positioning at the inner or outer end thereof, a guard at the inner end of the handle for the hook, and means locking the hook at either end of the handle.

3. A gaff hook comprising a handle, a sleeve slidably carried by the handle, a hook projecting from the sleeve, a guard at one end of the handle for receiving the hook, and catches at each end of the handle having internal locking engagement with the sleeve and holding the sleeve in either and inner or outer position on the handle.

JONAS C. ROWAN.

REFERENCES CITED

The following references are of record in the file of this patent:

UNITED STATES PATENTS

| Number | Name | Date |
|---|---|---|
| 509,228 | Larson | Nov. 21, 1893 |
| 734,590 | Minnich | July 28, 1903 |
| 2,311,401 | Lange | Feb. 16, 1943 |
| 2,372,743 | Schofield | Apr. 3, 1945 |

FOREIGN PATENTS

| Number | Country | Date |
|---|---|---|
| 181,906 | Great Britain | June 29, 1922 |